United States Patent [19]
Kobayashi et al.

[11] Patent Number: 5,962,551
[45] Date of Patent: Oct. 5, 1999

[54] POWDER OF TITANIUM COMPOUNDS

[75] Inventors: Isamu Kobayashi, Nara; Kenji Higashi, Sakai; Masafumi Yasuda, Amagasaki, all of Japan

[73] Assignee: Kubota Corporation, Osaka, Japan

[21] Appl. No.: 08/995,020

[22] Filed: Dec. 19, 1997

[30] Foreign Application Priority Data

Jan. 31, 1997 [JP] Japan ..................................... 9-018909
Apr. 9, 1997 [JP] Japan ..................................... 9-090521

[51] Int. Cl.$^6$ ................................. C08J 5/14; C08J 5/16; C01G 23/08
[52] U.S. Cl. .......................... 523/153; 523/149; 523/155; 423/598
[58] Field of Search ..................... 523/155, 153, 523/149; 423/598

[56] References Cited

U.S. PATENT DOCUMENTS

| | | | |
|---|---|---|---|
| 3,959,208 | 5/1976 | Baskin | 523/153 |
| 4,002,592 | 1/1977 | Baskin | 523/153 |
| 4,735,975 | 4/1988 | Iwata et al. | 523/152 |
| 4,898,843 | 2/1990 | Matushita et al. | 423/598 |

FOREIGN PATENT DOCUMENTS

| | | | |
|---|---|---|---|
| 466210 | 6/1950 | Canada | 423/598 |
| 3-237184 | 10/1991 | Japan | 523/155 |
| 4-318093 | 11/1992 | Japan | 523/155 |
| 6-9948 | 1/1994 | Japan | 523/153 |
| 8-53553 | 2/1996 | Japan | 523/155 |

OTHER PUBLICATIONS

Krishna P. S R: "Effect of Powder Synthesis Procedure on Calcium Site Occupancies in Barium Calcium Titanate: A Rietveld Analysis" Applied Physics Letters, vol. 62, No. 3, Jan. 18, 1993, pp. 231–233, XP000334797.

F. Selmi: "Microwave Calcination and Sintering of Barium Strontium Titanate" Materials Letters, vol. 12, 1992, Holland, pp. 424–428, XP002065554.

Patent Abstracts of Japan; vol. 098, No. 001, Jan. 30, 1998 & JP 09 255337 A (Kubota Corp), Sep. 30, 1997. Abstract.

Patent Abstracts of Japan; vol. 097, No. 004, Apr. 30, 1997 & JP 08 337420 A (Kubota Corp), Dec. 24, 1996. Abstract.

Patent Abstracts of Japan; vol. 096, No. 007, Jul. 31, 1996 & JP 08 073266 A (Sony Corp), Mar. 19, 1996. Abstract.

Patent Abstract of Japan; vol. 014, No. 342 (C–0743), Jul. 24, 1990 & JP 02 124762 A (Toto Ltd), May 14, 1990. Abstract.

Research Paper 2736 Journal of Research of the National Bureau of Standards vol. 58, No. 2 Feb. 1957.

Encyclopedia of Chemical Technology vol. 4, 1994.

*Primary Examiner*—Vasu Jagannathan
*Assistant Examiner*—Ling-siu Choi
*Attorney, Agent, or Firm*—Armstrong, Westerman Hattori, McLeland & Naughton

[57] ABSTRACT

Particles of titanium compounds each containing crystals of at least two kinds of alkaline earth metal titanate compounds of the perovskite type represented by $RTiO_3$ wherein R is an alkaline earth metal which crystals are joined together or joined to crystals of $TiO_2$. The friction material having added thereinto the powder of such particles of titanium compounds shows a high coefficient of friction and a low abrasive property to adjoining materials.

8 Claims, 1 Drawing Sheet

POWDER OF TITANIUM COMPOUNDS

FIELD OF THE INVENTION

The present invention relates to a powder of titanium compounds which comprises crystals of different kinds of alkaline earth metal titanates. More particularly, the invention relates to such a powder of titanate compounds which is suitable as the base of friction materials for providing sliding faces of brake linings, disk pads, clutch facings, etc. for use in the brake devices of motor vehicles, railroad cars, aircraft, industrial machines and the like.

BACKGROUND OF THE INVENTION

Friction materials for these brake devices are produced by admixing a fibrous base substance, filler, etc. with a thermosetting resin (such as a phenolic resin or epoxy resin) as a binder and pressing the mixture into a body with heating and application of pressure.

Friction materials capable of retaining a high coefficient of friction over a wide temperature range with good stability are required for use in brake devices for motor vehicles so as to render the device compact and lightweight.

Friction materials conventionally in use have incorporated therein chrysotile asbestos serving as the fibrous base substance, whereas with an increase in the temperature of the friction surface these friction materials become markedly worn or damaged and are susceptible to a fading phenomenon involving a marked reduction in the coefficient of friction. Chrysotile asbestos further has the problem of being carcinogenic.

Friction materials of the non-asbestos type are known which comprise fibers of potassium hexatitanate ($K_2Ti_6O_{13}$) of tunnel-type crystal structure in place of chrysotile asbestos fibers. These materials have better friction-wear characteristics than chrysotile asbestos fibers but the anti-fading properties and coefficient of friction of these materials are not enough at the high temperature.

Friction materials are also proposed wherein calcium titanate ($CaTiO_3$) in the form of a powder or fibers is used instead of fibers of alkali metal titanate like potassium hexatitanate (Japanese pre-examination publication HEI 8-53553). Calcium titanate is a synthetic inorganic compound having a crystal structure of the perovskite type. The presence of this compound affords friction-wear characteristics superior to those of the friction material which adds a powder of alkali metal hexatitanate compound. However, preparation of calcium titanate by solid-phase synthesis requires a heat treatment at a temperature of over 1300° C., consequently producing coarse crystals which come to cause sintering easily. The friction materials which add the powder of large crystal particles cause an inconvenience wherein the adjoining materials are severely abraded. Further when sintering is caused, after heat-treatment the crushing stage and the classifying stage are needed, while the crushed crystal particles are angular and more likely to abrade the adjoining materials.

An object of the present invention is to provide a powder of titanium compounds which, when this material is used as the base substance of friction materials, gives a higher coefficient of friction to the materials and can reduce the abrasion to the adjoining materials.

SUMMARY OF THE INVENTION

The present invention provides particles of titanium compounds which comprise crystals of at least two kinds of alkaline earth metal titanate compounds of the perovskite type represented by $RTiO_3$ (wherein R is an alkaline earth metal) which crystals are joined together.

The invention also provides particles of titanium compounds which comprise crystals of at least two kinds of alkaline earth metal titanate compounds of the perovskite type represented by $RTiO_3$ and crystals of $TiO_2$ joined to the crystals.

The invention further provides a friction material which is prepared by molding a raw material mixture containing a powder of titanium compounds, a binder resin and a friction-wear adjusting agent, the titanium compound powder comprising particles composed of crystals of at least two kinds of alkaline earth metal titanate compounds of the perovskite type represented by $RTiO_3$ (wherein R is an alkaline earth metal) which crystals are joined together.

The invention provides another friction material which is prepared by molding a raw material mixture containing a powder of titanium compounds, a binder resin and a friction-wear adjusting agent, the titanium compound powder comprising crystals composed of at least two kinds of alkaline earth metal titanate compounds of the perovskite type represented by $RTiO_3$ (wherein R is an alkaline earth metal) and crystals of $TiO_2$ joined to the crystals.

DETAILED DESCRIPTION OF THE INVENTION

Powder of Titanium Compounds

Figure 1:
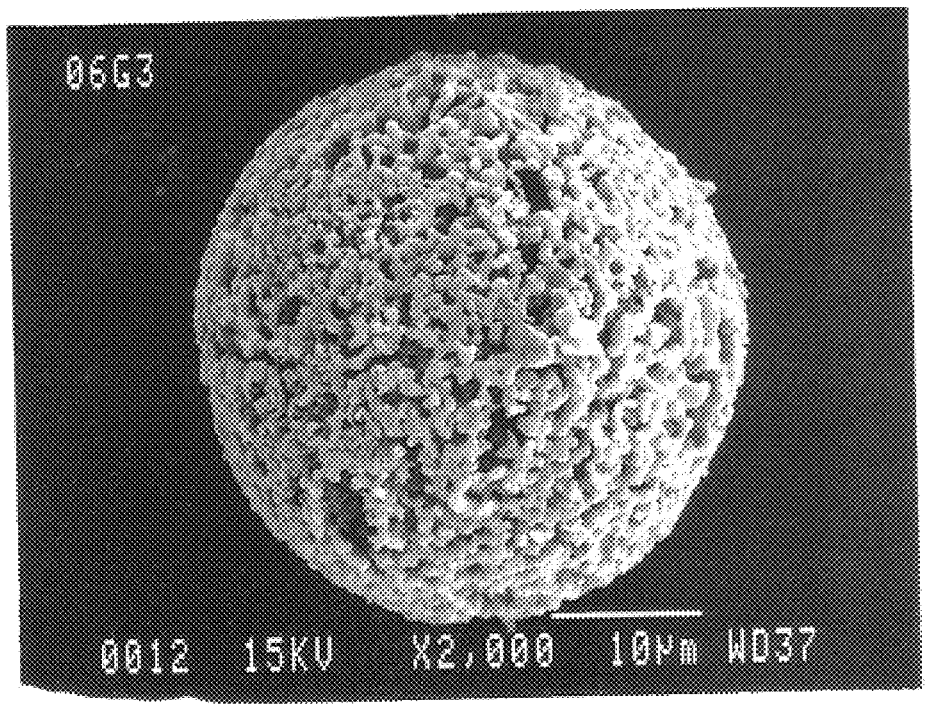
FIG. 1 is a photomicrograph (X2000) showing the form of a particle of titanium compounds of the invention which comprises crystals of at least two kinds of alkaline earth metal titanate compounds as joined together.

The invention provides a powder of titanium compounds which comprises spherical particles composed of crystals of at least two kinds of compounds of the perovskite type alkaline earth metal titanates represented by $RTiO_3$ (e.g., $MgTiO_3$ crystals and $CaTiO_3$ crystals in combination) which crystals are joined together. This spherical particle is in the form of an agglomerate comprising at least two kinds of crystals of alkaline earth metal titanates, these crystals being mingled together.

The invention provides another powder of titanium compounds which comprises spherical particles composed of crystals of at least two kinds of compounds of the perovskite type alkaline earth metal titanates represented by $RTiO_3$ and crystals of $TiO_2$ joined to the crystals. This spherical particle is in the form of an agglomerate comprising at least two kinds of crystals of alkaline earth metal titanates and crystals of $TiO_2$, these crystals being mingled together.

These powders of titanium compounds are prepared from a $TiO_2$ powder or a titanium compound powder forming $TiO_2$ when heated, and at least two kinds of alkaline earth metal oxide powders represented by RO (wherein R is an alkaline earth metal) or alkaline earth metal compound powders forming at least two kinds of oxides RO when heated, by mixing the powders together and heat-treating the powder mixture at a temperature of 900 to 1250° C. The $TiO_2$:RO molar ratio is 1 for preparing the former powder of titanium compounds (free from $TiO_2$ crystals), or is greater than 1 for preparing the latter powder of titanium compounds (containing $TiO_2$ crystals).

For example when used as the base component of brake friction materials, the powder of titanium compounds of the invention gives improved friction-wear properties as an effect of the mixture of at least two kinds of perovskite-type compounds.

In using the different alkaline earth metal titanate compounds in the raw material mixture, each of these compounds is used preferably in a proportion of at least 10 mole % so as to ensure the effect of the compounds.

In preparing the powder of titanium compounds of the invention, the mixture of titanium compound powder and alkaline earth metal compound powders which are different in the kind of alkaline earth metal element can be heat-treated (for solid-phase reaction) in a low temperature range of below 1300° C.

The proper temperature range for the heat treatment differs with the kind of alkaline earth metal elements to be mixed together. A heat treatment at a high temperature of over 1300° C. is required, for example, for producing a perovskite-type compound powder of $CaTiO_3$ crystals from a powder of single calcium compound, whereas when a mixture of two kinds of powders, e.g., a calcium compound powder and a magnesium compound powder, is used, $CaTiO_3$ crystals and $MgTiO_3$ crystals can be extracted and generated at a heat-treatment temperature of about 1100° C., whereby a powder is obtained wherein these two kinds of crystals are joined together.

The crystals of perovskite-type compounds forming the particles of the titanium compound powder obtained by the invention are extremely minute between sub-micron meter and several micron meter, presumably because each of the perovskite compounds acts to inhibit the crystal growth with each other during the crystal generating process.

The raw material powder mixture is free from the flux component (alkali metal compound), therefore does not require any treatment for removing the flux by dissolving after the heat treatment, permits no alkali metal element to remain therein and is free of the inconvenience due to presence of such an element. If an alkali metal remains in the resulting powder and when the powder is used, for example, for components of electric devices, the electric properties thereof is deteriorated. When the powder is used for resin compositions, the presence of the metal will entail the so-called alkali attack phenomenon (deterioration of the resin due to the liberation of alkali metal ions). However, the powder of the invention is free of such troubles.

Examples of titanium compounds for use in the raw material powder mixture are purified anatase, purified rutile, halides of titanate, hydroxides of titanate, etc. Examples of alkaline earth metal compounds are oxides, carbonates, halides, hydroxides, etc. of Mg, Ca, Ba and Sr. The powders of these compounds are preferably up to about 10 μm in mean particle size from the viewpoint of the efficiency of reaction of the heat treatment. Although a plurality of alkaline earth metal elements can be in a desired combination, it is desired that one of the alkaline earth metal compounds be a magnesium compound to conduct the heat treatment at a remarkably lowered temperature.

While the raw material powder mixture is made into particles by the dry method, the powder mixture can be made into granules, for example, by adding a suitable amount of water to the mixture to obtain a slurry and drying the slurry by a spray dryer. Since the form of products of the powder obtained by the heat treatment is dependent on the form of the granules prepared by the granule forming stage, it is desired that this stage produce granules which are 10 to 100 μm in size. If the granules obtained are smaller than 10 μm in size, the granules are sintered easily in the heat treatment stage. Therefore, after heat-treatment, the crushing stage is needed to crush the granules to the particles. On the other hand, if the granules are coarse sphere in excess of 100 μm, the granules abrade the adjoining materials severely.

The heat treatment is conducted in a temperature range of 900 to 1250° C. for a suitable period of time (e.g., 1 to 4 hours). At temperatures lower than 900° C., crystals of compounds of the perovskite type will not be extracted and generated, or the crystal extracted reaction can not be effected efficiently. The temperature is preferably at least 1050° C. On the other hand, the upper limit of the temperature is 1250° C. because there is no need to conduct the treatment at higher temperatures and also because the granules become sintered at higher temperatures, a mechanical crushing stage for the heat-treated product is needed.

The product resulting from the heat treatment is usually lightly treated, for example, with a vibrating screen to prepare loose particles. The powder of titanium compounds obtained contains granules which are generally of the same form as the granules before the heat treatment. Each particle of the granules has a composite structure wherein crystals of different compounds of the perovskite type are joined together.

Friction Material

Next, a description will be given of the friction material prepared from the powder of titanium compounds of the invention.

It is suitable that the proportion of the titanium compound powder to be used for the friction material be in the range of about 3 to 50 vol. %. If the proportion is less than about 3 vol. %, the desired improvement can not be achieved in the friction-wear properties, whereas if the proportion exceeds 50 vol. %, the effect of the powder will level off, and the increase in the proportion fails to produce a corresponding benefit.

The raw materials composition for preparing the friction material is the same as those for producing conventional common friction materials of the non-asbestos type except that the power of titanium compounds is added thereinto. The production process involves no particular requirements or limitations.

Examples of suitable binders are thermosetting resins such as phenolic resin, epoxy resin and silicone resin, and such resins as modified (modified with cashew oil, modified in drying properties or modified with rubber).

Known fibers can be used as fibrous base substances in combination with the powder of titanium compounds. Examples of useful fibers are organic fibers such as polyamide fiber, aramid fiber, acrylic fiber and phenolic fiber, inorganic fibers such as ceramic fiber, glass fiber, mineral wool and synthetic inorganic compound fiber (e.g., potassium titanate fiber), metal fibers such as steel fiber and nonferrous metal fibers (brass, copper and aluminum fibers), etc. At least one of these fibers is used. When desired, the fibrous base substance is used as sized with a silane coupling agent or titanate coupling agent in the usual manner and thereby improved in dispersibility or adhesion to the resin binder.

When desired, known friction-wear adjusting agents are added into the composition for forming the friction material of the invention. These agents include, for example, organic powders such as vulcanized or unvulcanized natural or synthetic rubber powders, cashew resin particles, cashew dusts, resin dusts and rubber dusts, inorganic powders such as graphite, molybdenum disulfide, antimony trisulfide, barium sulfate and calcium carbonate powders, metal powders such as copper, aluminum, zinc and iron powders, oxide powders such as alumina, silica, chromium oxide, copper oxide, titanium oxide, iron oxide and zircon powders, etc. At least one of these powders is used in a suitable amount.

As is the case with usual friction materials, suitable amounts of other additives, such as corrosion inhibitor, lubricant and abrasive, are usable when required.

The raw materials composition is preformed as by cold pressing and thereafter molded with application of heat and pressure (temperature, about 150 to 200° C.; pressure, about 10 to 40 MPa). The molded body is then withdrawn from the die, heat-treated (at a temperature of about 150 to about 200° C. for about 1 to about 12 hours) when required, subsequently machined and ground, and thereby finished to the desired friction material.

EXAMPLES

Preparation of Powders of Titanium Compounds

A purified anatase powder and at least two kinds of alkaline earth metal carbonate powders were mixed together, and water (in twice the amount of powder mixture by weight) was added to the mixture to obtain a slurry. The slurry was spray-dried into granules (about 30 μm in size). The granules were then placed into an alumina crucible and heat-treated in an electric oven (for 1 hour). The product was lightly loosened with a vibrating screen to obtain a powder of titanium compounds.

As a comparative example, a purified anatase powder and an alkaline earth metal carbonate powder were mixed together. The mixture was made into particles and heat-treated in the same manner as above to obtain a perovskite compound powder of single kind of crystals.

Table 1 shows the compositions of raw material powder mixtures, heat-treating temperatures and crystal compositions of titanium compound powders. Samples No. 1 to No. 10 are Invention Examples, and Samples No. 11 to No. 14 are examples of perovskite compound each obtained with use of a single kind of alkaline earth metal compound.

Invention Examples No. 1 to No. 10 are desired powders of perovskite-type compounds obtained at a lower heat-treating temperature than Comparative Examples 11 and 12 (powders of single-phase perovskite-type compound prepared with use of a powder of single alkaline earth metal compound). Comparative Examples No. 13 and No. 14 indicate that the powder of single alkaline earth metal compound failed to undergo the reaction of forming a perovskite compound when heat-treated at as low a temperature as in Invention Examples.

The powders obtained by Invention Examples and Comparative Examples No. 11 and No. 12 all comprised generally spherical granules and were about 30 μm in mean particle size. However, the crystals of perovskite compounds forming the particles of the granules of Invention Examples No. 1 to No. 10 were about 0.5 to about 2 μm in size (about 1 μm in mean size), whereas the crystals, which are single in kind, of Comparative Examples No. 11 and No. 12 were about 1 to about 5 μm in size (about 3 μm in mean size). Thus, the crystals of perovskite compounds constituting the spherical granules of Invention Examples are finer than those of Comparative Examples.

Figure 2:
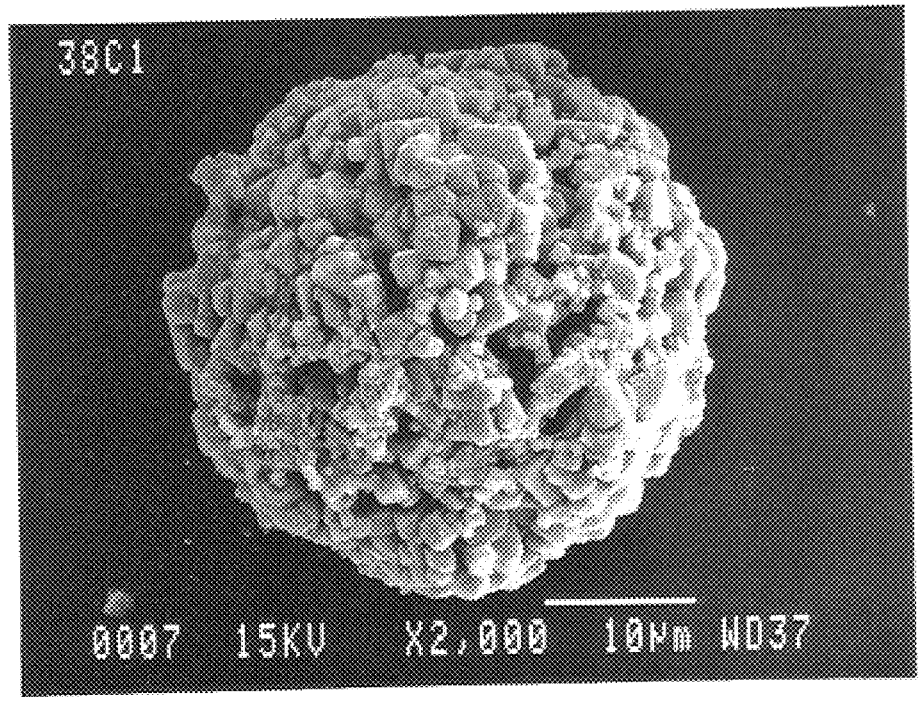
FIG. 2 is photomicrograph (X2000) showing the form of a conventional titanium compound particle comprising crystals of a single kind of alkaline earth metal titanate compound as joined together.

FIG. 1 shows the form of a particle of Invention Example No. 1, and FIG. 2 shows that of a particle of Comparative Example No. 11 (scanning electron photomicrographic images at X2000).

Preparation of Friction Materials

Given below are specific examples of friction materials according to the invention.

[Preparation of Raw Materials Compositions]

Table 2 shows raw materials compositions for preparing friction materials. In Table 2, No. 21 to No. 26 are Invention Examples, and No. 31 to No. 34 are Comparative Examples. The symbols A1 to A6, B1 and B2, and C1 given in the column of "Ti compounds" under "Base" represent the following powders. Each of the powders contains spherical granules of about 30 μm in mean size.

A1: $CaTiO_3:MgTiO_3$ (molar ratio=1:4)
(Titanium compounds of Table 1, No. 3)
A2: $CaTiO_3:MgTiO_3$ (molar ratio=1:2)
(Titanium compounds of Table 1, No. 2)
A3: $CaTiO_3:MgTiO_3$ (molar ratio=2:1)
(Titanium compounds of Table 1, No. 1)
A4: $SrTiO_3:MgTiO_3$ (molar ratio=1:4)

TABLE 1

| No | Raw Material Compounds and Molar Ratio | | | | Heat Treatment Temp. (° C.) | Crystals of Product and Molar Ratio |
|---|---|---|---|---|---|---|
| | $R_1$ | $R_2$ | $R_3$ | $TiO_2:R_1O:R_2O:R_3O$ | | |
| 1 | Ca | Mg | — | 3:2:1:— | 1100 | $CaTiO_3:MgTiO_3$ = 2:1 |
| 2 | Ca | Mg | — | 3:1:2:— | 1100 | $CaTiO_3:MgTiO_3$ = 1:2 |
| 3 | Ca | Mg | — | 5:1:4:— | 1100 | $CaTiO_3:MgTiO_3$ = 1:4 |
| 4 | Sr | Mg | — | 5:1:4:— | 1100 | $SrTiO_3:MgTiO_3$ = 1:4 |
| 5 | Ba | Mg | — | 5:1:4:— | 1100 | $BaTiO_3:MgTiO_2$ = 1:4 |
| 6 | Ca | Sr | — | 5:1:4:— | 1200 | $CaTiO_3:SrTiO_3$ = 1:4 |
| 7 | Ba | Sr | — | 5:1:4:— | 1200 | $BaTiO_3:SrTiO_3$ = 1:4 |
| 8 | Ca | Sr | Mg | 4:1:1:2 | 1100 | $CaTiO_3:SrTiO_3:MgTiO_3$ = 1:1:2 |
| 9 | Ba | Sr | Mg | 4:1:1:2 | 1100 | $BaTiO_3:SrTiO_2:MgTiO_3$ = 1:1:2 |
| 10 | Ca | Mg | — | 3.5:2:1:— | 1100 | $CaTiO_3:MgTiO_3:TiO_2$ = 2:1:0.5 |
| 11 | Ca | — | — | 1:1:—:— | 1350 | Crystals of $CaTiO_3$ only |
| 12 | Ba | — | — | 1:1:—:— | 1300 | Crystals of $BaTiO_3$ only |
| 13 | Ca | — | — | 1:1:—:— | 1100 | No $CaTiO_3$ crystals ($TiO_2$, CaO remained) |
| 14 | Ba | — | — | 1:1:—:— | 1100 | No $BaTiO_3$ crystals ($TiO_2$, BaO remained) |

(Titanium compounds of Table 1, No. 4)
A5: $CaTiO_3:SrTiO_3:MgTiO_3$ (molar ratio=1:1:2)
(Titanium compounds of Table 1, No. 8)
A6: $CaTiO_3:MgTiO_3:TiO_2$ (molar ratio=2:1:0.5)
(Titanium compounds of Table 1, No. 10)

B1: MgTiO₃ (single-phase powder)
  (Heat-treating temperature: 1100 )
B2: CaTiO₃ (single-phase powder)
  (Titanium compound of Table 1, No. 11)
C1: Powder of mixture of MgTiO₃ and CaTiO₃
  (Mixing molar ratio=1:2)
Chrysotile asbestos fibers of Class 6 were used for No. 34.

[Preparation of Friction Materials]

The raw materials composition was preformed (under a pressure of 15 MPa at room temperature for 1 minute), and thereafter molded with a die (under a pressure of 15 MPa at a temperature of 170° C. for 5 minutes). The molded body was withdrawn from the die, heat-treated in a drying oven (at 180° C. for 3 hours), then cut to a specified size and ground to obtain a friction material sample (disk pad).

[Friction Test]

The friction material sample was subjected to a friction test (the Second Effectiveness Test) according to JASO (Japan Automobile Standard Association) C406, "Passenger Vehicle Brake Device Dynamometer Test Method" to measure the coefficient of friction and the wear on a rotor which was the adjoining material. Table 2 shows the results.

The coefficients of friction listed in Table 2 are the values obtained under the conditions of initial speeds of braking of 50 km/h and 100 km/h and deceleration of 0.6 G.

The two or more alkaline earth metal titanate compounds of the perovskite type forming the granules of titanium compounds of the invention are in the form of crystals as joined together which are difficult to separate into loose crystals by a vibrating screen or the like, but are joined with such strength that they may be loosened into finer particles during the mixing of powders for the preparation of the friction material and when molded into a body and thereby subjected to an external force. Accordingly even if the titanium compound granules to be used for the production of friction materials are about 10 to about 100 μm in mean size, the granules are separated into fine particles during the mixing and pressing, with the result that the titanate compounds present in friction material are in the form of granules smaller than about 10 micrometers. This size reduction serves effectively for diminishing the abrasive property to adjoining materials.

The powder of titanate compounds of the invention is useful as the base of friction materials for providing, for example, brake devices as already stated.

According to the process for producing the powder of titanium compounds of the invention, the powder containing perovskite-type compounds can be obtained by a lower heat-treating temperature than is the case with the conventional solid-phase synthesis process. Since no flux component is used, the present process requires no treatment for

TABLE 2

| | Composition of Friction Material (vol. %) | | | | | | | Friction Coefficient (μ) | | Minimum | |
| --- | --- | --- | --- | --- | --- | --- | --- | --- | --- | --- | --- |
| | Base | | Binder | Friction-wear Adjusting Agent | | | | Initial Speed of Braking | | of Friction Coefficient | Rotor |
| No. | Titanium Compound | Asbestos | Keplar Pulp | Phenolic Resin | Cashew Dust | Copper Powder | Barium Sulfate | Lubricant Graphite | 50 km/h | 100 km/h | at Fading (μ) | Wear (μm) |
| 21 | [A1]10 | — | 8 | 20 | 15 | 5 | 35 | 7 | 0.45 | 0.40 | 0.29 | 7 |
| 22 | [A2]10 | — | 8 | 20 | 15 | 5 | 35 | 7 | 0.44 | 0.42 | 0.30 | 5 |
| 23 | [A3]10 | — | 8 | 20 | 15 | 5 | 35 | 7 | 0.44 | 0.44 | 0.31 | 2 |
| 24 | [A4]10 | — | 8 | 20 | 15 | 5 | 35 | 7 | 0.47 | 0.41 | 0.30 | 5 |
| 25 | [A5]10 | — | 8 | 20 | 15 | 5 | 35 | 7 | 0.43 | 0.43 | 0.30 | 3 |
| 26 | [A6]10 | — | 8 | 20 | 15 | 5 | 35 | 7 | 0.44 | 0.42 | 0.29 | 3 |
| 31 | [B1]10 | — | 8 | 20 | 15 | 5 | 35 | 7 | 0.55 | 0.39 | 0.29 | 2 |
| 32 | [B2]10 | — | 8 | 20 | 15 | 5 | 35 | 7 | 0.42 | 0.43 | 0.30 | 18 |
| 33 | [C1]10 | — | 8 | 20 | 15 | 5 | 35 | 7 | 0.42 | 0.41 | 0.29 | 16 |
| 34 | — | 10 | 8 | 20 | 15 | 5 | 35 | 7 | 0.36 | 0.36 | 0.26 | 25 |

With reference to Table 2, Samples No. 21 to No. 26 of the invention each prepared from a powder of crystals of different titanate compounds as joined together are more excellent in friction-wear characteristics and/or abrasive property to adjoining materials than Samples No. 31 and No. 32 prepared from a powder of single titanate compound or Sample No. 33 prepared from a mixture of powders each comprising a single titanate compound.

More specifically, Sample No. 31 has a high coefficient of friction of 0.55 at the initial speed of braking of 50 km/h but a lower coefficient of 0.39 at the braking speed of 100 km/h, and is therefore unstable in coefficient of friction. Samples No. 32 and No 33 cause marked wear on the rotor and are inferior in abrasive property to adjoining materials although high and stable in coefficient of friction.

The samples of the invention are manifestly different from Sample No. 34 added thereinto chrysotile asbestos fibers.

The high coefficient of friction and low abrasive property to adjoining materials of the friction materials of the invention are attributable to the fact that the alkaline earth metal titanate compounds of the perovskite type in the base component of the friction material are in the form of fine crystals.

removing the flux by dissolving after the heat treatment. This simplifies the process and results in a lower manufacturing cost.

The friction material of the present invention has excellent friction characteristics and is useful as brake linings, disk pads, clutch facings, etc. for use in motor vehicles, railroad cars and industrial machines in providing compacted and lightweight brake devices, contributing to improvements and stabilization of the braking function and to the durability of the devices.

What is claimed is:

1. A powder of titanium compounds prepared by mixing together (i) a powder of TiO₂ or a powder of titanium compound forming TiO₂ when heated, (ii) a powder of MgO or a powder of magnesium compound forming MgO when heated, and (iii) a powder selected from the group consisting of (a) a powder of oxide represented by the formula RO, wherein R is an alkaline earth metal selected from the group consisting of Ba and Sr, (b) a a mixture of powders of at least two different oxides, each represented by the formula RO, wherein R is selected from the group consisting of Ca, Ba and Sr, (c) a powder of alkaline earth metal compound forming an oxide represented by the formula RO when heated, wherein R is selected from the group consisting of Ba and Sr, and (d) a powder of alkaline earth metal compounds forming at least two different oxides, each represented by the formula RO when heated, wherein R is selected from the group consisting of Ca, Ba and Sr, the mixing ratio of the powder (i) to the total amount of the powders (ii) and (iii) being such that the molar ratio of $TiO_2$ to (MgO+RO) is substantially 1, and by calcining the mixture of the powders (i), (ii) and (iii) at a temperature of 900 to 125° C., the resultant powder of titanium compounds containing crystals of $MgTiO_3$ and at least one alkaline earth metal titanate compound of a perovskite type represented by $RTiO_3$, the crystals of $MgTiO_3$ and $RTiO_3$ being bonded together, and $MgTiO_3$ being present in the resultant powder in a proportion of at least 10 mole.

2. The powder of titanium compounds as defined in claim 1 wherein the mixture of the powders (i), (ii) and (iii) is formed into granules having a size of 10 $\mu$m to 100 $\mu$m prior to calcination thereof.

3. A powder of titanium compounds prepared by mixing together (i) a powder of $TiO_2$ or a powder of titanium compound forming $TiO_2$ when heated, (ii) a powder of MgO or a powder of magnesium compound forming MgO when heated, and (iii) a powder selected from the group consisting of (a) a powder of oxide represented by the formula RO, wherein R is alkaline earth metal selected from the group consisting of Ba and Sr, (b) a mixture of powders of at least two different oxides, each represented by the formula RO, wherein R is selected from the group consisting of Ca, Ba and Sr, or (c) a powder of alkaline earth metal compound forming an oxide represented by the formula RO when heated, wherein R is selected from the group consisting of Ba and Sr, and (d) a powder of alkaline earth metal compounds forming at least two different oxides, each represented by the formula RO when heated, wherein R is selected from the group consisting of molar ratio of TiO, to (MgO+RO) is greater than 1, and by calcining the mixture of the powders (i), (ii) and (iii) at a temperature of 900 to 1250° C., the resultant powder of titanium compounds containing crystals of $TiO_2$, $MgTiO_3$ and at least one alkaline earth metal titanate compound of a perovskite type represented by $RTiO_3$, the crystals of $TiO_2$, $MgTiO_3$ and $RTiO_3$ being bonded together, and $MgTiO_3$ being present in the resultant powder in a proportion of at least 10 mole %.

4. The powder of titanium compounds as defined in claim 3 wherein the mixture of the powders (i), (ii) and (iii) is formed into granules having a size of 10 $\mu$m to 100 $\mu$m prior to calcination thereof.

5. A powder of titanium compounds prepared by mixing together (i) a powder of $TiO_2$ or a powder of titanium compound forming $TiO_2$ when heated, (ii) a powder of MgO or a powder of magnesium compound forming MgO when heated, and (iii) a powder of CaO or a powder of calcium compound forming CaO when heated, the mixing ratio of the powder (i) to the total amount of the powders (ii) and (iii) being such that the molar ratio of TiO, to (MgO+RO) is substantially 1, and by calcining the mixture of the powders (i), (ii) and (iii) at a temperature of 900 to 1250° C., the resultant powder of titanium compounds containing crystals of $MgTiO_3$ and $CaTiO_3$ of a perovskite type represented by $RTiO_3$, the crystals of $MgTiO_3$ and $CaTiO_3$ being bonded together, and each of $MgTiO_3$ and $CaTiO_3$ being present in the resultant powder in a proportion of at least 10 mole %.

6. A powder of titanium compounds prepared by mixing together (i) a powder of $TiO_2$ or a powder of titanium compound forming $TiO_2$:when heated, (ii) a powder of MgO or a powder of magnesium compound forming MgO when heated, and (iii) a powder of CaO or a powder of calcium compound forming CaO when heated, the mixing ratio of the powder (i) to the total amount of the powders (ii) and (iii) being such that the molar ratio of $TiO_1$ to (MgO+RO) is greater than 1, and by calcining the mixture of the powders (i), (ii) and (iii) at a temperature of 900 to 1250° C., the resultant powder of titanium compounds containing crystals of $MgTiO_3$ and $CaTiO_3$ of a perovskite type represented by $RTiO_3$, the crystals of $MgTiO_3$ and $CaTiO_3$ being bonded together, and each of $MgTiO_3$ and $CaTiO_3$ being present in the resultant powder in a proportion of at least 10 mole %.

7. A friction material prepared by molding a raw material containing a powder of titanium compound and at least a binder resin, the powder of titanium compound containing particles of crystals of $MgTiO_3$ and at least one alkaline earth metal titanate compound of a perovskite type represented by $RTiO_3$ wherein R is an alkaline earth metal selected from the group consisting of Ca, Ba and Sr, the crystals of $MgTiO_3$ and $RTiO_3$ being bonded together, and $MgTiO_3$ being present in a proportion of at least 10 mole %.

8. A friction material prepared by molding a raw material containing a powder of titanium compound and at least a binder resin, the powder of titanium compound containing particles of crystals of $TiO_2$, $MgTiO_3$ and at least one alkaline earth metal titanate compound of a perovskite type represented by $RTiO_3$ wherein R is an alkaline earth metal selected from the group consisting of Ca, Ba and Sr, the crystals of $TiO_2$, $MgTiO_3$ and $RTiO_3$ being bonded together. and $MgTi_3$ being present in a proportion of at least 10 mole %.

* * * * *